June 1, 1954

G. SCHMIDT 2,680,190

APPARATUS FOR ELECTRICALLY HEATING AND KEEPING AT
A PREDETERMINED TEMPERATURE LIQUID SUBSTANCES

Filed June 10, 1949

Inventor Gerrit Schmidt

Patented June 1, 1954

2,680,190

UNITED STATES PATENT OFFICE 2,680,190

APPARATUS FOR ELECTRICALLY HEATING AND KEEPING AT A PREDETERMINED TEMPERATURE LIQUID SUBSTANCES

Gerrit Schmidt, Hoorn, Netherlands

Application June 10, 1949, Serial No. 98,179

Claims priority, application Netherlands June 12, 1948

1 Claim. (Cl. 219—43)

This invention relates to an apparatus for electrically heating and keeping at a predetermined temperature liquid substances, and it has particular relation to a device comprising a vessel containing the liquid, a container in which the vessel is placed, heating means and thermostatic control means.

In a known apparatus of this kind a bottle or vessel is inserted in a container, the bottom of which comprises heating means provided with metal housing. A bi-metallic switch is arranged in the lateral wall of the container. Said switch is connected in series with the heating member and receives heat by a small resilient metal plate from the bottle.

This apparatus has the following drawbacks:

(1) The heat contact between the bi-metallic switch and the wall of the bottle is not satisfactory and does not reliably operate in practice.

(2) If the bottle contains only a small quantity of liquid, the switch lies above the liquid level, whereby super-heating occurs; if the switch is arranged at a lower level, it is influenced too much by the heating device.

(3) It is necessary to heat the housing of the heating device to red heat in order to heat the liquid reasonably quickly to the desired temperature. This is very inconvenient after heating when the heating current is interrupted by the bi-metallic switch.

(4) Even if the housing is heated to red heat, 150 cm.$^3$ liquid require about five minutes for being heated from 15° C. to 38° C.

(5) The circulation of the liquid during heating is not satisfactory. When larger quantities of the liquid are heated, considerable differences of temperature in the upper and lower layers of the liquid occur.

It is an object of the invention to eliminate these drawbacks. In order to obtain this object, the arrangement of parts, i. e., the heating device and the thermostatic control device have been essentially changed according to my invention.

According to the invention, a sleeve is arranged in liquid-tight manner around the closed end of the vessel, whereas between the walls of the vessel and the sleeve the heating device and the entire or partial thermostatic control device are arranged in such manner that the elements form an unbreakable unit.

Other objects of the invention appear from the following specification.

The invention will be described by way of example, in connection with the appended drawings.

Figure 1:
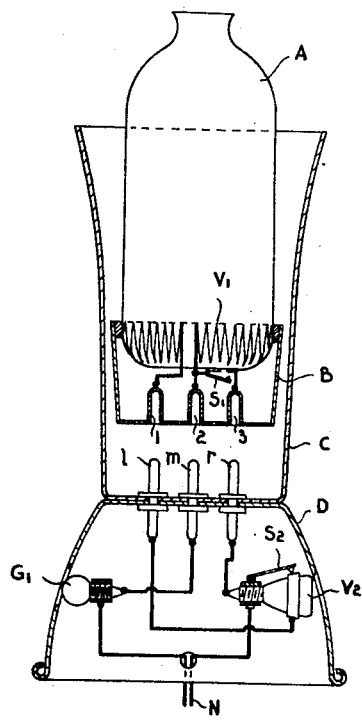
Figure 1 represents an embodiment of the invention, in which vessel and sleeve are in a non-connected position with the contact members of the foot.

In the apparatus according to Figure 1, the closed end of vessel A is surrounded by the heating device $V_1$, while the thermostatic control device, or part of it, bears against the bottom of the vessel A. The control device is represented by bi-metallic switch $S_1$. The vessel A forms an unbreakable unit with $V_1$ and $S_1$ which is a characteristic feature of the invention. Around $V_1$ and $S_1$ a liquid-tight sleeve B is arranged, which is connected with the vessel A. The sleeve B may consist of any suitable material, e. g. synthetic resin or metal. The sleeve B and the vessel A fit in container C, which is provided with foot D.

Heating device $V_1$ can be a resistance wire which can be cemented or enamelled to the wall of the vessel A, or it may be a resistance member injected or electrically arranged on the wall. In general $V_1$ will be arranged or connected in a suitable manner against the wall of the vessel so that the coefficients of expansion of the same are adapted to each other and $V_1$ constitutes an unbreakable unit with vessel A.

In order to arrange a resistance wire in zigzag form as a heating device on the wall of the vessel A, the following method can be applied.

The resistance wire is tightly stretched by wrapping on a strip of zinc band of moderate width. This unit is clamped, for example, with two thin rubber bands to the wall of the vessel in the correct position. By immersion of the vessel in diluted hydrochloric acid solution the zinc is dissolved, while the other parts are not attacked and no shifting occurs. After the wire is lightly cemented the rubber bands are removed and further cementing can take place. The saturated zinc chloride solution thus formed can be used as soldering water.

Figure 2:
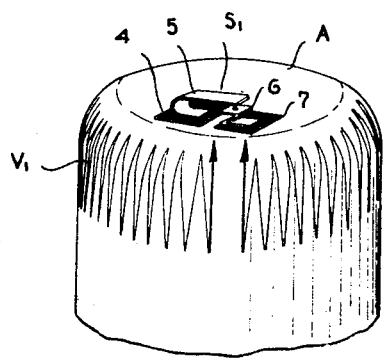
Figure 2 shows in perspective view the closed end of the vessel to which the sleeve has not yet been connected.

If desired, heating means $V_1$ can run partly on the glowing passage between the lateral wall and the actual bottom of the vessel A (see Figure 2).

The electrical and mechanical removable connection between vessel A and sleeve B, on the one hand, and container C and foot D, on the other hand, can be obtained in any suitable manner.

In Figure 1, contact openings 1, 2 and 3 are provided in sleeve B and contact pins $l$, $m$ and $r$ are provided in container C. If the entire vessel A with sleeve B is supposed to be boiled, e. g. in the case of feeding bottles, contact openings 1, 2 and 3 must be arranged in liquid-tight manner. This can be done, for example, by rubber seals at connections 1, 2 and 3.

In the foot D an incandescent lamp $G_1$ is arranged, which is visible through an opening in the wall of the foot. Lamp $G_1$ is connected in series with the heating device $V_1$ and acts as warning and safety device.

The second part of the thermostatic control device, which is arranged within foot D, comprises an incandescent lamp $V_2$ and a bi-metallic switch $S_2$. Wires N serve to connect the entire apparatus to a current supply source.

The bi-metallic switch $S_1$ shown in Figure 2 consists of a bi-metallic strip 5 that is bent and connected by soldering at the bent end to a metal gauze or plate 4, e. g., a shim or fine meshed copper gauze which gauze or plate itself is arranged, e. g. cemented, on the wall of vessel A.

The counter contact, i. e. angle piece 6, is arranged in a similar manner over plate or gauze 7 on the wall of vessel A.

It will be apparent that the above arrangement represents essential improvements in comparison with apparatus known from the art.

By combining heating device $V_1$ to an unbreakable unit with vessel A, a practically ideal heat transfer to the liquid to be heated is obtained. As a result of this, the period for heating 150 cm.³ liquid from 15° C. to 38° C. has been practically halved and amounts to approximately 2½ minutes. This is very important in all kinds of applications.

A further essential advantage is the absence of the very inconvenient after-heating, when the required temperature has been reached. By the excellent heat contact, which is also better than in the known apparatus, the temperature of the heating device becomes only slightly higher than that of the liquid.

Application of the ring-shaped heating device $V_1$ in the manner shown along the lateral wall of vessel A results in circulation of the liquid to be heated, i. e. warm liquid rises along the walls and colder liquid sinks in the center of vessel A. Such circulation of the liquid reduces differences in temperature within the liquid to a minimum.

Another advantage is that according to the invention the smallest quantities of liquid have heat contact with control switch $S_1$.

According to the invention the temperature lag of $S_1$ with respect to the liquid is also reduced to a minimum by arranging $S_1$ either against the bottom or over a metal gauze 4 and 7 of a desired dimension and/or by arranging control switch $S_1$ at such eccentric spot on the bottom that the last rest of temperature difference between $S_1$ and the liquid is compensated by a small heat supply from the heating device $V_1$ to $S_1$.

In the known apparatus switch $S_1$ showed sticking and also development of heat upon repeated connecting. For this reason, $S_1$ cannot be made arbitrarily small and this influences sensibility of $S_1$. In arranging switch $S_1$ on the gauze (4 and 7) against the bottom of vessel A, a wider bi-metallic strip can be applied with a thickness as slight as possible, so that the sensibility, which depends approximately in the square on the thickness, can be maintained with less sticking and less action by the interruption heat.

A bi-metallic strip can be applied which has as one component Invar, and as the other component a copper-bronze of good heat conductivity. It has been found that combination of Invar with berylliumbronze (1–2% Be) gives very satisfactory results. This bronze has practically the same heat conductivity as copper and at the same time the high coefficient of expansion thereof is maintained, whereas the mechanical properties better suit the Invar (nickel steel). Good heat conductivity means less lag of temperature and, consequently, higher sensibility.

It has been found to be of advantage to use instead of one bi-metallic strip 5 and one stationary counter contact 6, a system of two bi-metallic strips of smaller length in counter movement. The heat is then supplied at two spots over a copper gauze or other gauze (4 and 7), the length of strip to be heated is smaller and sensibility higher.

In both cases a bi-metallic strip can be designed as a fork with a contact on either prong of the fork and the same number of counter contacts. An improved sensibility is thus obtained by the weaker and shorter sticking of the contacts. The interruption heat is also divided.

The contacts can also be provided with very thin fins to carry the heat off rapidly.

Figure 3:
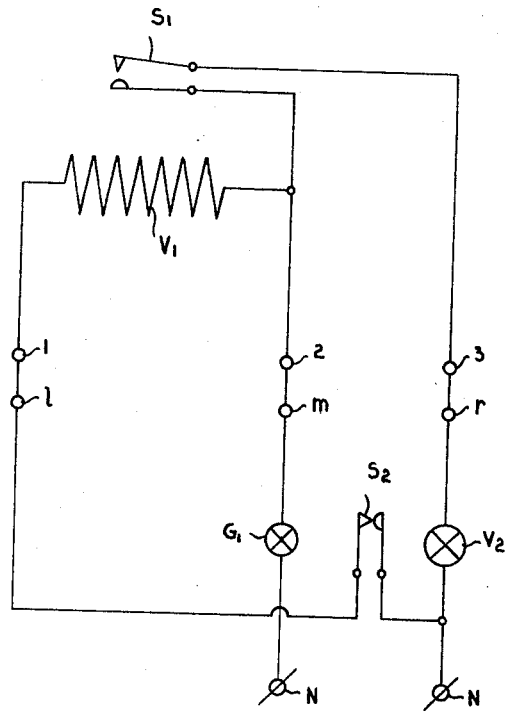
Figure 3 is an electrical scheme of the embodiment according to Figure 1.

According to the scheme of Figure 3, two circuits are to be distinguished:

$N$, $G_1$, $m$, 2, $V_1$, $l$, $l$, $S_2$, N (heating)

and $N$, $G_1$, $m$, 2, $S_1$, 3, $r$, $V_2$, N (control)

The apparatus shown in Figures 1 and 3 operates as follows:

In cold condition $S_2$ is closed and $S_1$ open. When NN is connected to a voltage source, the current passes through the heating circuit, whereby lamp $G_1$ is lighted and heating device $V_1$ brings the liquid to the desired temperature. When the adjusting temperature is practically reached, one part of the thermostatic control device, i. e. bi-metallic switch $S_1$, is closed. Thereby auxiliary current is sent through the control circuit. Lamp $V_2$ is lighted and produces heat by which main switch $S_2$ is caused to open, and $V_1$ cools then down like the liquid. Thereupon $S_1$ opens again and closes $S_2$ so that lighting of $V_2$ is terminated.

It will be apparent that between $S_1$ and $S_2$ a pendulum movement of opening and closing occurs, the temperature of the liquid being slightly shifted from and to the adjusted temperature. However, this shifting is so slight that a practically constant temperature of the liquid is obtained.

As a result of this connection, the functions of temperature control and interruption and closing of the heating current by $V_1$, are separated. Thereby sticking is completely reduced and the interruption heat becomes also much smaller. For example, when connecting NN on the mains of 220 volts, for $V_2$ a lamp for 220 volts and approximately 4½ watts can be used. This means that the current passing through the sensitive bimetallic switch amounts to only 20 milli-amperes. $V_2$ consequently limits the current passing through $S_1$.

Incandescent lamp $V_2$ can be replaced by a small concentrated resistance (e. g. 8–10 Kohms).

The entire apparatus $V_2$, $S_2$ can be replaced by other relays. E. g. instead of $V_2$ the coil of an electro-magnetic relay and instead of $S_2$ the contact thereof or one or the other electronic relay can be used.

Figure 4:
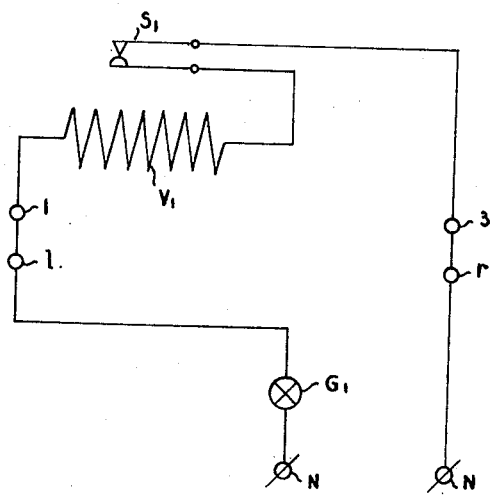
Figure 4 is the scheme of another embodiment according to the invention.

The switch illustrated in Figure 4 shows another embodiment in which $V_2$, $S_2$, $m$ and 2 have been omitted. Here the thermostatic control device is concentrated as a whole in $S_1$. The operation is as follows:

In cold condition, switch $S_1$ is closed. NN is again connected with a tension source and a current passes through heating device $V_1$, whereby the liquid is heated. At the adjusting temperature $S_1$ is opened and lighting of incandescent lamp $G_1$ is stopped. When the liquid is somewhat cooled, $S_1$ is closed again, and the liquid is heated again. Thus repeated opening and closing of $S_1$ occurs and the temperature of the liquid is shifted from and to the adjusted temperature. This shifting is very slight and temperature of the liquid is maintained substantially constant.

Thus, the embodiment shown in Figure 4 has practically the same advantages as the apparatus shown in Figures 3 and 1.

Although in Figure 4 the total current passes through $S_1$, sticking and the developed connecting heat need not result in a drawback. The steps mentioned above, such as the use of cooling fins, bi-metallic strips as a fork, two counter moving bi-metallic strips, more than one contact system, etc., are adapted to reduce or eliminate these drawbacks.

The apparatus embodying the invention has numerous applications, such as the heating of feeding bottles, tea- or coffee-makers, apparatus for keeping beverages at warm condition, laboratory thermostat, and the like.

It is preferred to use the switch according to Figure 3 in apparatus of large dimensions, e. g. as hotel apparatus, because in spite of the precautions to be taken, the greater current required here for heating, could damage the switch $S_1$ in Figure 3.

It will be understood that container C and the foot D can be made of any suitable material, for example a suitable synthetic resin composition, which provides for electric insulation. For example, container C and foot D are conventional cups consisting of bakelite. The bottoms of both are connected with each other by contact pins $l$, $m$ and $r$ (or only $l$ and $r$ according to Figure 4).

The unit can also be made of chromium plated aluminum or copper, and foot D can be provided with a sealing bottom of soft aluminum folded around the foot edge of D.

When liquid is inadvertently spilled in container C, it can be absorbed by a layer of absorbing substance arranged on the bottom of C. If desired, liquid-tight partitions can be arranged between the pins. Should, however, short circuiting occur through liquid between the pins, lamp $G_1$ acts as a safety means and burns through. $G_1$ is arranged in an easily removable manner.

Sleeve B protects vessel A, which is manufactured, for example, of thin hard glass or porcelain, from being smashed or cracked.

In a further embodiment of the invention, the electrical scheme is equal to that of Figure 3. The difference with respect to the apparatus according to Figure 1 consists in that in said further embodiment $S_2$ and $V_2$ are also arranged between vessel A and sleeve B. The three contact members $l$, $m$ and $r$ with 1, 2 and 3 are now reduced to two, namely $m$ and $r$ with 2 and 3. The energy of $V_2$ can be now reduced to approximately 1 watt.

Heating device $V_2$ can now consist of a resistance wire wrapped on a strip of mica. $V_2$ is made so small (but sufficient to serve $S_2$) that on switching off $V_1$, $V_2$ yields just sufficient heat for maintaining temperature of the liquid practically in equilibrium, i. e. in such manner that only a slight decrease of the temperature occurs and only after about ½ hour (depending on the surrounding temperature) a small amount of heat has to be supplied.

It will be still more clearly understood from the above that $V_2$ also is an economical heating device. Since the decrease of the temperature of the liquid results in the first place from evaporation, the amount of heat saved does not depend on how much liquid is present in vessel A. Like in the other embodiments, a well balanced temperature control is obtained also in this case.

It will be understood that this invention is not limited to the details specifically described above and can be carried out with various modifications without departing from the scope of the invention as defined in the appended claim.

I claim:

Apparatus for electrically heating and maintaining at a predetermined temperature a liquid substance, comprising in combination a vessel of poor heat conductivity, adapted to contain said substance; a heating element attached to the outer surface of the lateral wall of said vessel, surrounding the closed end of the vessel and adapted to be connected to a source of electric current; a thermal switch attached to the outer surface of the bottom wall of the vessel; a cup-shaped member adapted to receive the closed end of the vessel and to enclose the heating element and the thermal switch, and liquid-tightly connected to the vessel; a container adapted to removably receive said vessel and the cup-shaped element connected therewith, the closed end of said container being provided with lead-in means for supplying current to the heating element; said switch being controlled by the heat of substance heated in the vessel, in combination with heat received by air conduction directly from the heating element enclosed by said cup-shaped member in such manner that the thermal lag with heat to transfer from the heated substance to the thermal switch is eliminated.

References Cited in the file of this patent

UNITED STATES PATENTS

| Number | Name | Date |
| --- | --- | --- |
| 1,033,799 | Harvey | July 30, 1912 |
| 1,978,089 | Jones | Oct. 23, 1934 |
| 2,046,125 | Lacy | June 30, 1936 |
| 2,194,820 | Connell et al. | Mar. 26, 1940 |
| 2,233,485 | Park | Mar. 4, 1941 |
| 2,258,210 | Maxwell | Oct. 7, 1941 |
| 2,269,689 | Reichold | Jan. 13, 1942 |
| 2,546,983 | Del Buttero | Apr. 3, 1951 |

FOREIGN PATENTS

| Number | Country | Date |
| --- | --- | --- |
| 601,041 | Great Britain | Apr. 26, 1948 |